US011641869B2

United States Patent
Foster et al.

(10) Patent No.: US 11,641,869 B2
(45) Date of Patent: *May 9, 2023

(54) METHODS FOR MAKING PLANT PROTEIN CONCENTRATES

(71) Applicant: INNOVATIVE PROTEINS HOLDING, LLC, North Sioux City, SD (US)

(72) Inventors: Seth A. Foster, Dakota Dunes, SD (US); Tim G. Foster, North Sioux City, SD (US); Donald L. Crank, North Sioux City, SD (US)

(73) Assignee: Innovative Proteins Holding, LLC, North Sioux City, SD (US)

( * ) Notice: Subject to any disclaimer, the term of this patent is extended or adjusted under 35 U.S.C. 154(b) by 314 days.

This patent is subject to a terminal disclaimer.

(21) Appl. No.: 16/961,836

(22) PCT Filed: Jan. 14, 2019

(86) PCT No.: PCT/US2019/013460
§ 371 (c)(1),
(2) Date: Jul. 13, 2020

(87) PCT Pub. No.: WO2019/140363
PCT Pub. Date: Jul. 18, 2019

(65) Prior Publication Data
US 2021/0076727 A1   Mar. 18, 2021

Related U.S. Application Data

(63) Continuation of application No. 15/871,329, filed on Jan. 15, 2018, now Pat. No. 10,143,226.

(51) Int. Cl.
| | |
|---|---|
| *A23L 29/00* | (2016.01) |
| *A23L 33/00* | (2016.01) |
| *A23J 3/14* | (2006.01) |
| *A23L 33/185* | (2016.01) |
| *A23J 1/14* | (2006.01) |
| *A23L 2/66* | (2006.01) |
| *A23C 9/123* | (2006.01) |
| *A23L 33/19* | (2016.01) |
| *A23C 11/10* | (2021.01) |
| *A23L 11/60* | (2021.01) |

(52) U.S. Cl.
CPC ........... *A23L 33/40* (2016.08); *A23C 9/123* (2013.01); *A23C 11/106* (2013.01); *A23J 1/14* (2013.01); *A23J 1/148* (2013.01); *A23J 3/14* (2013.01); *A23L 2/66* (2013.01); *A23L 11/60* (2021.01); *A23L 29/00* (2016.08); *A23L 33/185* (2016.08); *A23L 33/19* (2016.08); *A23V 2002/00* (2013.01)

(58) Field of Classification Search
CPC .......... A23L 33/40; A23L 33/19; A23L 29/00; A23L 33/185; A23L 2/66; A23C 9/123; A23C 11/103; A23C 11/106; A23J 1/14; A23J 1/148; A23J 3/14; A23V 2002/00
USPC ........................................................ 426/583
See application file for complete search history.

(56) References Cited

U.S. PATENT DOCUMENTS

| | | |
|---|---|---|
| 4,259,358 A | 3/1981 | Duthie |
| 4,420,425 A | 12/1983 | Lawhon |
| 4,677,065 A | 6/1987 | Buchbjerg et al. |
| 5,356,637 A | 10/1994 | Loosen et al. |
| 5,520,935 A * | 5/1996 | Eriksen .................. C12P 21/06 435/68.1 |
| 5,716,801 A | 2/1998 | Nielsen et al. |
| 5,989,600 A | 11/1999 | Nielsen et al. |
| 6,024,990 A | 2/2000 | Kofoed et al. |
| 7,087,720 B2 | 8/2006 | Murray et al. |
| 7,186,807 B2 | 3/2007 | Salome et al. |
| 7,214,401 B2 | 5/2007 | Kunst et al. |
| 7,300,681 B2 | 11/2007 | Wasche et al. |
| 7,625,588 B2 | 12/2009 | Barker et al. |
| 7,687,088 B2 | 3/2010 | Schweizer et al. |
| 8,124,162 B2 | 2/2012 | Passe et al. |
| 8,476,061 B1 | 7/2013 | Theil |
| 8,529,981 B2 | 9/2013 | Tang |
| 8,580,558 B2 | 11/2013 | Theil |
| 8,741,356 B2 | 6/2014 | Barker et al. |
| 9,149,063 B2 | 10/2015 | Dhalleine et al. |
| 9,635,875 B2 | 5/2017 | Schweizer et al. |
| 9,738,920 B2 | 8/2017 | Plank |

(Continued)

FOREIGN PATENT DOCUMENTS

| | | |
|---|---|---|
| WO | WO 1992/015697 A1 | 9/1992 |
| WO | WO 2009/155557 A2 | 12/2009 |

(Continued)

OTHER PUBLICATIONS

Marie Bildstein et al., "An enzyme-based extraction process for the purification and enrichment of vegetable proteins to be applied in bakery products," *Eur. Food Res. Technol.*, (2008), vol. 228; pp. 177-1286.

(Continued)

*Primary Examiner* — Hamid R Badr (74) *Attorney, Agent, or Firm* — Bell & Manning, LLC (57) ABSTRACT

Food-grade pulse protein concentrates prepared from various pulses and flours derived therefrom are provided. Also provided are method of making the concentrates and beverages and foodstuffs that include the concentrates. The pulse protein concentrates are characterized by a high protein content, high digestibility, and complete essential amino acid profile.

19 Claims, 4 Drawing Sheets

(56) References Cited

U.S. PATENT DOCUMENTS

| | | | |
|---|---|---|---|
| 2001/0034443 | A1 | 10/2001 | Furuta et al. |
| 2007/0207255 | A1 | 9/2007 | Crank |
| 2008/0206430 | A1 | 8/2008 | Avila |
| 2009/0203880 | A1 | 8/2009 | Gosnell et al. |
| 2009/0286961 | A1 | 11/2009 | Tang |
| 2012/0252065 | A1 | 10/2012 | Rozeszain et al. |
| 2012/0258236 | A1 | 10/2012 | Cruz Serna et al. |
| 2013/0189408 | A1 | 7/2013 | Segall et al. |
| 2013/0243904 | A1 | 9/2013 | Cordle et al. |
| 2015/0230497 | A1 | 8/2015 | Segall et al. |
| 2015/0368293 | A1 | 12/2015 | Barata et al. |
| 2017/0042209 | A1 | 2/2017 | Lau et al. |
| 2017/0208834 | A1 | 7/2017 | Scholten et al. |
| 2017/0265505 | A1 | 9/2017 | Bansal-Mutalik et al. |
| 2017/0347767 | A1* | 12/2017 | Hudson ................. A01M 29/12 |
| 2019/0216126 | A1 | 7/2019 | Foster et al. |
| 2020/0230190 | A1 | 7/2020 | Lecocq et al. |
| 2020/0281246 | A1 | 9/2020 | Foster et al. |

FOREIGN PATENT DOCUMENTS

| | | |
|---|---|---|
| WO | WO 2011/146140 A1 | 11/2011 |
| WO | WO 2017/117398 A1 | 7/2017 |

OTHER PUBLICATIONS

Ranjani Amarakoon, "Study on Amino Acid Content in Selected Varieties of *Pisum sativum* (peas) by Ion Exchange Chromatography," 2012 International Conference on Nutrition and Food Sciences IPCBEE, vol. 39, @ (2012) IACSIT Press, Singapore; pp. 1-4.

"Dietary protein quality evaluation in human nutrition," Report of an FAO Expert Consultation, Protein Quality Report No. 92, Mar. 31-Apr. 2, 2011 Auckland, New Zealand; pp. 1-79. ISSN 0254-4725.

David W. Plank et al., "An In Vitro Protein Digestibility Corrected Amino Acid Score (PDCAAS) Method for Rapid Screening of Food Prototypes," IFT Poster 2015, Medallion Labs.

Pascal Leterme et al., "Amino acid composition of pea (*Pisum sativum*) proteins and protein profile of pea flour," *Journal of the Science of Food and Agriculture* Jan. 1990, vol. 53; pp. 107-110.

Typical Amino Acid Profile Compealete™ 85% Pea Protein, publicly available before Jan. 15, 2018.

Specification Sheet Compealete™ 85% Pea Protein, publicly available before Jan. 15, 2018.

JN Pea Protein Specification Sheet Amino Acid Profile, publicly available before Jan. 15, 2018.

Boye et al., Comparison of the Functional Properties of pea, chickpea, and lentil protein concentrates processed using ultrafiltration and isoelectric precipitation techniques, Food Research International 43, 2010; pp. 537-546.

Igbasan et al., Field Peas: Chemical Composition and Energy and Amino Acid Availabilities for Poultry, Canadian Journal of Animal Science, 1997, pp. 293-300.

D. Hickling, Canadian Feed Peas Industry Guide, Third Edition, 2003, published by Pulse Canada; pp. 1-36.

Federal Register, vol. 58, No. 3, Jan. 6, 1993, pp. 2194.

Publication by Genencor International, Inc., publicly available prior to Jan. 15, 2018.

Owusu-Ansah et al., Pea Proteins: A Review of Chemistry, Technology of Production, and Utilization, Food Reviews International, 7(1), 1991, pp. 103-134.

Pisane Pea Protein Specification Sheet Amino Acid Profile, publicly available before Jan. 15, 2018.

Puris Pea Protein Specification Sheet Amino Acid Profile, PURISPea 860 Version 2.0, Apr. 30, 2015.

Roquette pea protein Specification Sheet Amino Acid Profile, Jul. 16, 2014.

Shungta Pea Protein Amino Acid Profile Analysis, Covance, Dec. 22, 2015.

Taherian et al., Comparative study of functional properties of commercial and membrane processed yellow pea protein isolates, Food Research International 44, Oct. 2011, pp. 2505-2514.

Lam et al., Pea Protein Isolates: Structure, extraction, and functionality, Food Reviews International, Taylor & Francis, Dec. 18, 2016.

Pelgrom et al., Dry Fractionation for production of functional pea protein concentrates, Food Research International 53, 2013, pp. 232-239.

Stone et al., Functional attributes of pea protein isolates prepared using different extraction methods and cultivars, Food Research International 76, Nov. 18, 2014, pp. 31-38.

Mondor et al., Production of pea protein concentrates by ultrafiltration: Influence of hollow-fibre module, Innovative Food Science and Emerging Technologies 14, 2012, pp. 135-138.

Adebiyi et al., Functional properties of proein fractions obtained from commercial yellow field pea (*Pisum sativum* L.) seed protein isolate, Food Chemistry 128, Apr. 3, 2011, pp. 902-908.

Croy et al., The major albumin proteins from pea (*Pisum sativum* L), Biochem Journal 218, 1984, pp. 795-803.

S. Tian, The isolation, modification and evaluation of field pea proteins and their application in foods, Doctor of Philosophy Thesis, School of Life Sciences and Technology, Victoria University of Technology, Australia, 1998.

B. G. Swanson, Pea and lentil protein extraction and functionality, 78th American Oil Chemists' Society Annual Meeting, May 217, 1987, New Orleans, LA.

Nosworthy et al., Does the concentration, isolation, or deflavoring of pea, lentil, and faba bean protein alter protein quality? Cereal Foods World, vol. 62, No. 4, Jul. 2017, pp. 139-142.

Alice Kuo, "Management of Effluents From Field Pea Wet Milling Process Using Ultrafiltration Technology," A thesis submitted to the Faculty of Graduate Studies, Food Science Department, University of Manitoba, Winnipeg, Manitoba, May 2000, pp. 1-155.

Lei (Leigh) Gao et al., "Pilot Scale Recovery of Proteins from a Pea Whey Discharge by Ultrafiltration," Lebensm.-Wiss. u.-Technol., vol. 34, pp. 149-158, May 2001.

The International Search Report and Written Opinion issued for International Patent Application No. PCT/US19/13460 dated May 23, 2019; pp. 1-13.

Non-Final Office Action dated Jul. 16, 2021 for U.S. Appl. No. 16/171,855; pp. 1-10.

* cited by examiner

FIG. 1

Table 1: Complete Protein Requirement Categories

| Essential Amino Acids | OLDER CHILD THRU ADULT<br>Complete Protein Requirement - FAO/WHO older child, adolescent; & adult mg/g protein pattern | CHILD (6 MOS – 3 YEARS)<br>Complete Protein Requirement - FAO/WHO child (6 months to 3 years) mg/g protein pattern | INFANT (BIRTH - 6 MOS)<br>Complete Protein Requirement - FAO/WHO infants (birth to 6 months) mg/g protein pattern |
|---|---|---|---|
| Tryptophan | 6.6 | 8.5 | 17 |
| Threonine | 25 | 31 | 44 |
| Isoleucine | 30 | 32 | 55 |
| Leucine | 61 | 66 | 96 |
| Lysine | 48 | 57 | 69 |
| Methionine+Cystine | 23 | 27 | 33 |
| Phenylalanine+Tyrosine | 41 | 52 | 94 |
| Valine | 40 | 43 | 55 |
| Histidine | 16 | 20 | 21 |

Findings and Recommendations of the 2011 FAO Expert Consultation on Protein Quality Evaluation in Human Nutrition
FAO Food and Nutrition Paper #92 "Dietary Protein Quality Evaluation in Human Nutrition" Apr 2011.

FIG. 2

Table 2: Example 1 Amino Acid Scores
note: all numbers are milligrams of amino acids per gram of protein

| Essential Amino Acids | **Complete Protein Requirement - FAO/WHO child (6 months to 3 years) average mg/g protein pattern | Example 1 Pea Protein Compealete™ | Example 1 Split Peas Raw Material | Ultrafiltration Permeate | Example 7 Chickpea Protein Concentrate |
|---|---|---|---|---|---|
| Tryptophan | 8.5 | 10.6 | 10 | 11 | 10 |
| Threonine | 31 | 40 | 42 | 36 | 36 |
| Isoleucine | 32 | 47 | 44 | 24 | 44 |
| Leucine | 66 | 77 | 75 | 44 | 73 |
| Lysine | 57 | 70 | 76 | 61 | 67 |
| Methionine + Cystine | 27 | 27.4 | 24 | 14 | 27 |
| Phenylalanine + Tyrosine | 52 | 89 | 89 | 56 | 88 |
| Valine | 43 | 52 | 48 | 26 | 46 |
| Histidine | 20 | 25 | 25 | 14 | 26 |
| Amino Acid Score | | 1 | 0.89 | 0.52 | 1 |
| Digestibility | | 1 | not analyzed | not analyzed | 0.97 |
| PDCAAS | | 1 | | | 0.97 |

Table 3: Example 3 Competitor PDCAAS Compared to Examples 1 and 2

| Essential Amino Acids | **Complete Protein Requirement - FAO/WHO older child, adolescent, & adult average mg/g protein pattern | **Complete Protein Requirement - FAO/WHO child (6 months to 3 years average mg/g protein pattern | Example 1: Compealete™ | Comparative Example 2 Isoelectric Precipitation Process | Pisane | Puris | Roquette | Shungta | JN |
|---|---|---|---|---|---|---|---|---|---|
| | | | | | COMPETITOR'S PUBLISHED AA PROFILE | | | | |
| Tryptophan | 6.6 | 8.5 | 10.6 | 10 | 10 | 10 | 10 | 8 | 7 |
| Threonine | 25 | 31 | 40 | 38 | 39 | 41 | 38 | 33 | 31 |
| Isoleucine | 30 | 32 | 47 | 46 | 45 | 48 | 47 | 46 | 44 |
| Leucine | 61 | 66 | 77 | 79 | 84 | 84 | 82 | 80 | 78 |
| Lysine | 48 | 57 | 70 | 69 | 72 | 74 | 71 | 72 | 68 |
| Methionine+Cystine | 23 | 27 | 27.4 | 21.6 | 21 | 19 | 21 | 16 | 16 |
| Phenylalanine+Tyrosine | 41 | 52 | 89 | 106 | 93 | 92 | 93 | 86 | 80 |
| Valine | 40 | 43 | 52 | 48 | 50 | 50 | 50 | 48 | 47 |
| Histidine | 16 | 20 | 25 | 23 | 25 | 25 | 25 | 22 | 24 |
| Amino Acid Score 6 months to 3 yrs | | | 1.00 | 0.80 | 0.78 | 0.70 | 0.78 | 0.59 | 0.59 |
| Disgestibility | | | ***1.00 | *0.94 | *0.94 | *0.94 | *0.94 | *0.94 | *0.94 |
| Calculated PDCAAS | | | 1.00 | 0.75 | 0.73 | 0.66 | 0.73 | 0.65 | 0.65 |
| Compealete Improvement in PDCAAS | | | 0% | 25% | 27% | 34% | 27% | 35% | 35% |

* The Federal Register, January 6, 1993, Vol. 58, No. 3, P. 2194
** Findings and Recommendations of the 2011 FAO Expert Consultation on Protein Quality Evaluation in Human Nutrition FAO Food and Nutrition Paper #92 "Dietary Protein Quality Evaluation in Human Nutrition" Apr 2011.
*** In-vitro digestibility analysis performed using General Mills US patent #9,738,920

METHODS FOR MAKING PLANT PROTEIN CONCENTRATES

CROSS-REFERENCE TO RELATED APPLICATIONS

This application is a National Stage of International Application No. PCT/US19/13460, filed Jan. 14, 2019, which claims the benefit of U.S. patent application Ser. No. 15/871,329, filed Jan. 15, 2018, and issued as U.S. Pat. No. 10,143,226 on Dec. 4, 2018, the contents of which are herein incorporated by reference.

FIELD OF THE INVENTIONS

The field of this invention is food-grade protein concentrates prepared from yellow field peas and other pulses and flours derived therefrom, methods of making the concentrates, and food products prepared using the concentrates.

BACKGROUND

The market for plant protein concentrates as nutritional supplements is large and growing. Unlike protein concentrates derived from some other plants, such as soybeans, protein concentrates derived from yellow field peas have the advantage of being hypoallergenic. Unfortunately, yellow pea protein concentrates having a complete essential amino acid profile, a digestibility score of 1.00, and Protein Digestibility Corrected Amino Acid Score (PDCAAS) of 1.00 are not currently available.

Certain cultivars of yellow peas naturally contain the correct amino acid profile to meet one of the age categories for a complete amino acid profile, as published by the Food and Agricultural Organization of the United Nations/World Health Organization (FAO/WHO). However, the digestibility of yellow field peas is relatively low, with typical Digestibility Scores of 0.61-0.74, primarily due to the presence of low digestible proteins (e.g., prolamins and glutelins), fibers, and the influence of anti-nutritional factors. (See, Field Peas: Chemical Composition and Energy and Amino Acid Availabilities for Poultry", Canadian Journal of Animal Science, 1997 and the Canadian Field Pea Industry Guide. Third Edition, 2003 and Leterme et al. in the Journal of the Science of Food and Agriculture. vol. 53 pp. 107-110 (1990).) Moreover, the processing techniques presently used to extract, isolate, and concentrate pea proteins from yellow peas result in concentrates that do not have a complete essential amino acid profile, even when they are derived from yellow pea pulses that may have a complete essential amino acid profile.

The processes currently being used for the production of protein concentrates from yellow field peas and flours produced therefrom generally include three steps: 1) aqueous protein extraction, 2) separation of water-insoluble materials, and 3) a final separation of water-soluble non-protein components from the proteins. The protein extraction (Step 1) is performed in one of three processes: alkaline pH extraction, wherein the pH of a yellow pea/water slurry is increased by adding sodium, potassium, or calcium hydroxide; fermentation with lactic acid or other bacteria; or salt extraction, wherein a specific ionic strength of salt is added to take advantage of the salting-in and salting-out phenomena of proteins. In Step 2, the major portion of the water-insoluble, non-protein components of starch, crude fiber, sugars, non-starch polysaccharides, oligosaccharides, fat, and ash are removed from the protein extracts from Step 1 by separating the insoluble materials from the water phase using physical methods such as settling, decanting, centrifuging, filtrating, or screening to provide a protein-enriched extract and an insoluble co-product. In Step 3, the protein-enriched extract obtained in Step 2 is further processed to separate the water-soluble proteins from other water-soluble non-protein components in the protein-enriched extract. This step is most commonly carried out using an isoelectric precipitation (also referred to as acid precipitation).

To address the deficiencies in the essential amino acid profiles of pea protein concentrates made using conventional processing techniques, producers have resorted to blending together concentrates derived from different protein sources (with different limiting amino acid compositions) to create a product which has a blended amino acid profile that meets the industry standards for a complete amino acid profile. For example, typically companies would blend pea and rice proteins together, as rice is high in sulfur-containing amino acids and low in lysine; whereas, pea is high in lysine and low in sulfur-containing amino acids. For example, U.S. patent application publication number 20080206430, "Compositions Consisting of Blended Vegetarian Proteins" identifies a protein blend of soy, peas, and rice proteins blended in specific proportions to obtain a protein product with a blended amino acid of 1.00; even still, this blended formula does not provide a PDCAAS of 1.00 because the digestibility of the protein blend was not 1.00.

SUMMARY

Food-grade plant protein concentrates prepared from yellow field peas and other pulses, such as chickpeas, lentils, fava beans and mung beans, and flours derived therefrom are provided. Also provided are methods of making the concentrates and food products that include the concentrates.

One aspect of the inventions provides plant protein concentrates comprising proteins, which may be proteolytically modified plant proteins, wherein the plant protein concentrate is free of proteins other than plant proteins and has a plant protein concentration of at least 60%, based on dry weight, a complete amino acid profile for adults, greater than or equal to 22 milligrams of sulfur-containing amino acids per gram of protein, an in vitro Protein Digestibility of at least 0.97, and a PDCAAS value of at least 0.97. This includes embodiments of the plant protein concentrates that have a plant protein (e.g., yellow pea protein, chickpea protein, lentil protein, fava bean protein, or mung bean protein) concentration of at least 70%, based on dry weight, and/or greater than or equal to 23 milligrams of sulfur-containing amino acids per gram of protein for older children, adolescents, and adults (ages 3 and up), and/or an in vitro Protein Digestibility of at least 0.98, and/or a PDCAAS value of at least 0.98. Some embodiments of these plant protein concentrates have a sulfur-containing amino acid content of 27 milligrams or greater and, therefore, provide a complete amino acid profile for children aged 6 months through 3 years. Some embodiments of the plant protein concentrates have a plant protein (e.g., yellow pea protein, chickpea protein, lentil protein, fava bean protein, or mung bean protein) concentration of at least 80%, based on dry weight.

Embodiments of the plant proteins may be hydrolyzed, but are typically only mildly hydrolyzed, having a Degree of Hydrolysis (DH) of at least one and/or a DH of less than 15.

Embodiments of the plant protein concentrates include albumin protein fragments with molecular weights in the range from about 5 kDa to about 40 kDa.

Another aspect of the inventions provides food products that include plant protein concentrates of the type described herein in combination with a beverage and/or a foodstuff. Thus, the food products comprise a beverage or foodstuff; and a plant protein concentrate, such as a yellow pea, chickpea, lentil, fava bean, or mung bean concentrate, combined with the beverage or foodstuff.

In various embodiments of the food products, the plant protein concentrate has a plant protein concentration of at least 60%, based on dry weight, a complete amino acid profile for adults, greater than or equal to 22 milligrams of sulfur-containing amino acids per gram of protein, an in vitro Protein Digestibility of at least 0.97, and a PDCAAS value of at least 0.97. In some embodiments of the food products, the plant protein concentrate has a plant protein concentration of at least 70%, based on dry weight, a complete amino acid profile for older children, adolescents, and adults (ages 3 and up), greater than or equal to 23 milligrams of sulfur-containing amino acids per gram of protein, an in vitro Protein Digestibility of at least 0.98, and a PDCAAS value of at least 0.98. In some embodiments of the food products, the plant protein concentrates have a sulfur-containing amino acid content of 27 milligrams or greater and, therefore, provide a complete amino acid profile for children aged 6 months through 3 years Some embodiments of the plant protein concentrates contained in the food products have a plant protein concentration of at least 80%, based on dry weight. The food product may be free of plant proteins other than the plant proteins contained within the plant protein concentrates and may be free of any proteins other than the plant proteins contained within the plant protein concentrates.

Exemplary food products include non-dairy liquid beverages, non-dairy beverage powders, and non-dairy yogurts.

Another aspect of the inventions provide a method for making a protein concentrate from pulse particles, such as yellow pea, chickpea, lentil, fava bean, or mung bean particles, the method comprising: (a) conducting an alkaline extraction, such as an alkaline proteolytic extraction, on an aqueous slurry of the pulse particles; (b) removing water-insoluble proteins and other water-insoluble components from the aqueous slurry to provide a water-soluble, protein-rich liquid fraction; (c) optionally performing an amylase carbohydrate reaction on the water-soluble, protein-rich liquid fraction; (d) separating water-soluble proteins from water-soluble lower molecular weight peptides and water-soluble non-proteins from the protein-rich, liquid fraction via ultrafiltration using an ultrafiltration membrane that concentrates the albumin proteins to provide a protein-rich retentate; and (e) removing water from the protein-rich retentate to provide a dry pulse protein concentrate. In some embodiments of the methods, the ultrafiltration membrane has a molecular weight cutoff of 5 kDa or smaller.

In various embodiments of the methods, the alkaline proteolytic extraction is conducted at a pH in the range from 7.5 to 9.5 for a duration sufficient to provide the pulse proteins with a DH of greater than zero and less than 15.

In various embodiments of the methods, the aqueous slurry comprises from 5 wt. % to 12 wt. % of the pulse particles, the pulse particles having a maximum particles size of less than 200 microns; and the water-soluble, protein-rich liquid has an insoluble solids content of no greater than 2.0 vol. %.

In various embodiments of the methods, the amylase reaction is carried out on the water-soluble, protein-rich liquid at a pH in the range from 4.0 to 7.0, including 5.0 to 6.0, to convert starch, dextrins, maltodextrins, and complex sugars into smaller fragments to allow these to pass through into the permeate fraction of the ultrafiltration process. Previous attempts to utilize lower molecular weight cutoff membranes in the production of yellow pea protein concentrates did not provide a yellow pea protein concentration of at least 70%, based on dry weight. Implementation of the amylase/glucoamylase can assist in reducing the molecular weight of the carbohydrate fraction allowing the permeation of these carbohydrates through the ultrafiltration membrane during the ultrafiltration step, allowing for the recovery of a pulse protein concentrate having a protein concentration of at least 80%, based on dry weight. The utilization of an ultrafiltration membrane with a lower molecular weight cutoff improves the recovery of albumin proteins, thereby increasing protein amino acid score.

In various embodiments of the methods, the ultrafiltration is carried out in a multistage ultrafiltration-diafiltration system that provides the protein-rich retentate with a pulse protein concentration of at least 60 wt. % of protein, based on a dry weight basis.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Food-grade plant protein concentrates prepared from pulses and flours derived therefrom are provided. Also provided are methods of making the concentrates and food products that include the concentrates. The plant protein concentrates are characterized by a pulse protein content of at least 60 wt. % based on dry weight basis, a high digestibility and a complete essential amino acid profile.

As used herein, the term plant protein concentrate refers to a composition that is derived from a given plant and has a plant protein concentration of at least 60 wt. %, and desirably at least 70 wt. %, based on a dry weight basis. By way of illustration, the term yellow pea protein concentrate refers to a composition that is derived from yellow peas and has a yellow pea protein concentration of at least 60 wt. %, and desirably at least 70 wt. %, based on a dry weight basis. This definition for plant protein concentrate includes compositions derived from a given plant having a plant protein concentration of at least 90 wt. %, which would be generally recognized in the field as plant protein isolates. The term plant proteins include both whole proteins and protein fragments that result from, for example, cleaving the tertiary structure of whole proteins.

Various embodiments of the plant protein concentrates are derived from pulses including yellow peas, chickpeas, lentils, fava beans and mung beans and are characterized by a complete amino acid profile for adults, greater than or equal to 22 milligrams of sulfur-containing amino acids (cysteine+methionine) per gram of protein, an in vitro Protein Digestibility of at least 0.97, and a PDCAAS value of at least 0.97. This includes embodiments of the protein concentrates having an in vitro Protein Digestibility of at least 0.99 and a PDCAAS value of at least 0.99, and further includes embodiments of the protein concentrates having an in vitro Protein Digestibility of 1.0 and a PDCAAS value of 1.0. In some of these embodiments, the protein concentrates are characterized by a complete amino acid profile for children ages 6 months to 3 years, since they contain greater than or equal to 27 milligrams of sulfur-containing amino acids (cysteine+methionine) per gram of protein.

PDCAAS is a method of gauging protein quality. PDCAAS was adopted by the U.S. Food and Drug Administration and the Food and Agricultural Organization of the United Nations/World Health Organization in 1993 as the preferred method to determine protein quality. PDCAAS is calculated by multiplying the "Protein Digestibility" for a protein composition by the composition's "Amino Acid Score". The Federal Register. Jan. 6, 1993, Vol. 58, No. 3. P. 2194 provides a standard listing of common protein Digestibility Scores, based on animal studies, and pea protein concentrate is identified on the Federal Register with a Protein Digestibility of 0.94.

Protein Digestibility can be analyzed via an in vitro analysis technique, as described in U.S. Pat. No. 9,378,920. The digestibility score derived from this in vitro technique, which involves enzymatically digesting a protein containing sample to simulate digestion that would occur inside a mammalian body, is referred to herein as in vitro Protein Digestibility. The in vitro Protein Digestibility analysis can be performed commercially by Medallion Labs (General Mills; Minneapolis, Minn.). Medallion Labs provides the in vitro Protein Digestibility as a "ASAP—Quality Score" (Animal-Safe Accurate Protein Quality Score).

The in vitro Protein Digestibility uses enzymatic digestion steps similar to stomach and small intestine for protein digestion. For each cleavage of a protein backbone by an enzyme, an alpha-amino nitrogen (primary amine) is exposed which is reactive to the colorimetric reagent, ninhydrin, and allows for quantification of the digestion reaction. The analysis entails a pepsin digestion at a pH of 2, followed by a trypsin/chymotrypsin digestion at a pH of 7.5, followed by a TCA precipitation and centrifugation, followed by the reaction of the resulting supernatant with ninhydrin. Quantification is done by absorbance spectroscopy.

Figure 2:
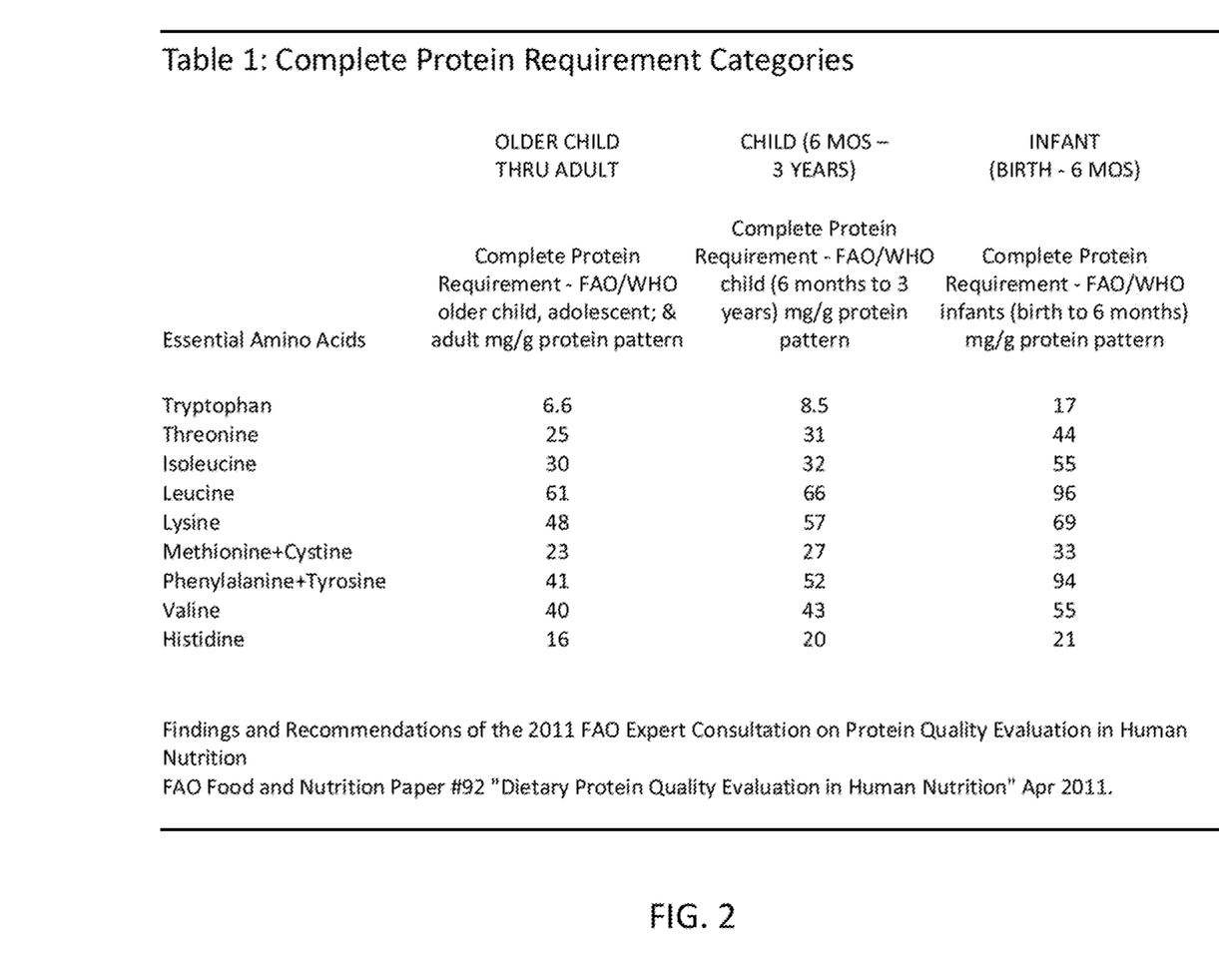
FIG. 2 provides the 2011 FAO/WHO recommended amino acid scoring patterns for Infant (birth to 6 months), Young Children (6 months to 3 years), and Older Children, Adolescents, and Adults.

The other component to PDCAAS calculation is Amino Acid Score. The Amino Acid Score compares a protein's eleven Essential Amino Acids: Histidine, Isoleucine, Leucine, Lysine, Methionine+Cysteine (the sulfur-containing amino acids), Phenylalanine+Tyrosine (aromatic amino acids), Threonine, Tryptophan, and Valine, with the recommended essential amino acid protein profiles of The Food and Agricultural Organization of the United Nations/World Health Organization (1985), which vary depending on factors like age, weight, gender, and other criteria. In 2011, FAO published Food and Nutrition Paper #92 "Dietary Protein Quality Evaluation in Human Nutrition" recommended consolidation of the amino acid pattern to three categories: Infant (birth to 6 months), Young Children (6 months to 3 years), and Older Children, Adolescents, and Adults. Table 1 in FIG. 2 provides the 2011 FAO/WHO recommended amino acid scoring patterns for each of these three classifications. For the purposes of this disclosure, complete amino acid profiles for a given age group refer to the complete amino acid profiles published in the FAO published Food and Nutrition Paper #92, as published in 2011 and listed in Table 1 of FIG. 2.

The Amino Acid Score compares the above-referenced amino acid pattern which is appropriate for the age of the individual in order to determine any limiting amino acid(s). The lowest concentration of limiting amino acid divided by the pattern for that amino acid equals the Amino Acid Score. For example, for most yellow pea protein concentrates that are currently available, an upper limit is placed on the Amino Acid Score due to insufficient Sulfur-containing Amino Acids (Methionine+Cysteine). If the complete protein requirement for older children through adults is set at 23 mg/g, and a protein concentrate only has 16 mg/g sulfur-containing amino acids then the formula to calculate the Amino Acid Score would be 16 mg/23 mg=0.71.

Amino acid contents and Amino Acid Scores for the protein concentrates are analyzed using Official Method 988.12 (for amino acids, other than tryptophan) or 988.15 (for tryptophan), as published Official Methods of Analysis of AOAC International, $20^{th}$ Edition (2016), Gaithersburg, Md.

The final formula to determine PDCAAS for a protein concentrate multiplies the Amino Acid Score times the Protein Digestibility. Thus, the PDCAAS for a protein concentrate having an Amino Acid Score of 0.71 and a Protein Digestibility of 0.94 (obtained from the previously identified Federal Register reference) would be calculated as follows: Amino Acid Score 0.71×Protein Digestibility 0.94=0.66 PDCAAS. Commercial pea protein concentrates typically are deficient in sulfur-containing amino acids (Cysteine+Methionine) and/or tryptophan with Amino Acid Scores ranging from 0.65 to 0.73 for children aged 6 months to 3 years.

Without intending to be bound to any particular theory of the inventions, the inventors believe that the ability of the present processing methods to provide protein concentrates that have an in vitro Protein Digestibility of 1 and a PDCAAS score of 1 can be attributed, at least in part, to the preferential retention of proteins, such as albumins and albumin protein fragments, that have a high sulfur-containing amino acid content and/or a high tryptophan content. This is consistent with the failure of other processing methods to achieve such high Protein Digestibility, sulfur-containing amino acid contents, and PDCAAS scores. For example, the isoelectric precipitation process that is used in the commercial production of certain plant proteins, such as pea proteins, captures most of the globulin proteins, but few, if any, of the albumin proteins that are present. Salt extraction, followed by insolubles separation and then dialysis or micellization, another widely used processing technology, also captures only a small portion of the albumin proteins. In contrast, the present processes, which utilize ultrafiltration with select membranes to separate water-soluble proteins from water-soluble non-protein carbohydrates, fats, and ash are able to preferentially capture a major portion of the albumin proteins that are present by employing a membrane with a molecular weight cutoff of about 5 kDa. In addition, the present methods are able to address problems that can hinder the use of ultrafiltration for extracting proteins from protein sources, including reduced throughput and fouling of the membranes by residual starch, fiber, and fat in a clarified extract (e.g., in an ultrafiltration feed slurry) and a protein retentate.

Methods of forming protein concentrates from pulses are described in more detail below. Although the description below and Examples 1-6 focus on forming yellow pea protein concentrates, it should be understood that yellow peas are used as only one illustrative example. The methods can be applied to form concentrates of other pulses including chickpeas (see Example 7), lentils, fava beans, and/or mung beans. Moreover, the protein concentrates made from these other pulses can meet the protein concentration, amino acid profiles, sulfur-containing amino acid concentrations, protein digestibilities, PDCAAS values, solubilities, and degrees of hydration that are achieved for the yellow pea protein concentrates described herein.

Three primary steps in the methods for producing yellow pea protein concentrates are an aqueous alkaline extraction, followed by a separation of water-insoluble materials from the water-soluble materials, including the water-soluble yellow pea proteins, and the subsequent separation of water-soluble, non-protein components and lower molecular weight water-soluble proteins from higher molecular weight water-soluble proteins via ultrafiltration. In some embodiments of the methods, the aqueous alkaline extraction is a proteolytic extraction that results in proteolytic modification of the yellow pea proteins.

Figure 1:
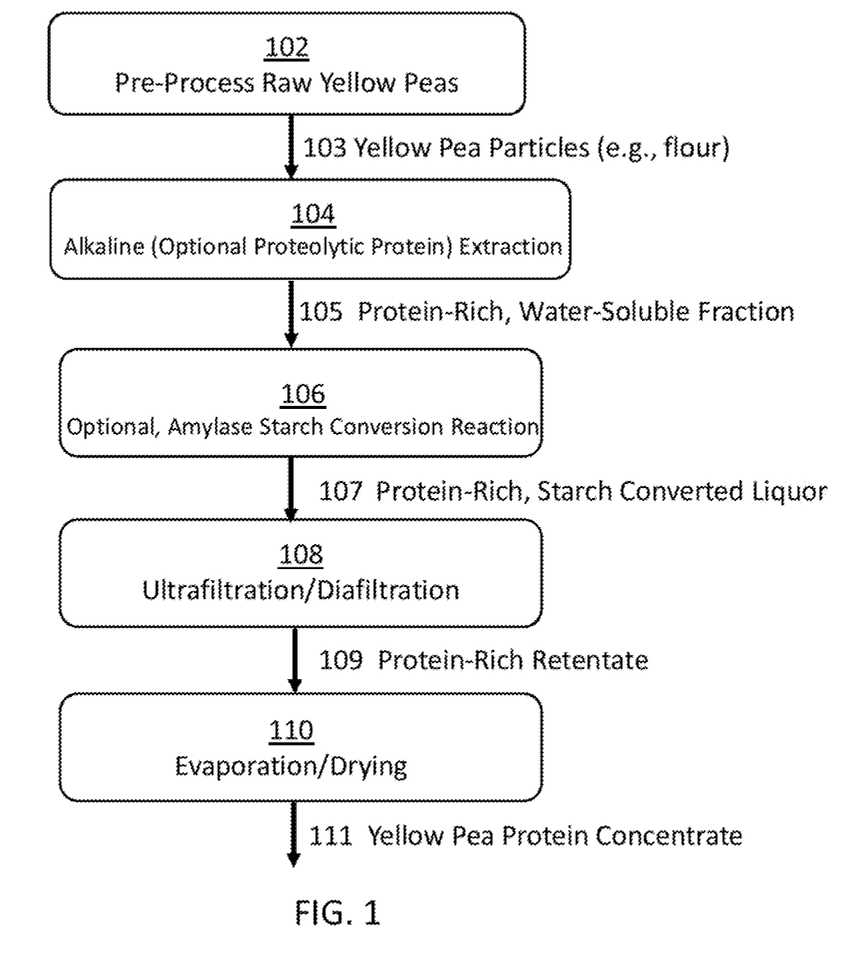
FIG. 1 is block flow diagram of one embodiment of a process for producing a protein concentrate from yellow field peas. Although the process is exemplified using yellow peas as the pulses and yellow pea proteins as the plant (pulse) proteins, the process can also be applied to other pulses, such as chickpeas, lentils, fava beans or mung beans, to provide plant (pulse) protein concentrates.

FIG. 1 shows a block flow diagram of one embodiment of a process for producing a protein concentrate from yellow field peas. Initially, the yellow peas from the field, which typically have a protein concentration of about 20 wt. % to about 28 wt. %, are pre-processed 102 by cleaning and dehulling to remove their hulls and foreign material, such as weeds, soil, and seeds, and then breaking them down into halves and smaller pieces. Alternatively, the cleaned dehulled peas may be dry milled into a pea flour in a pin mill, pulverizer, or hammer mill with particle size between 100 and 200 microns, and such pea flour may be utilized as the raw material for the present processes. Dehulled peas may also be processed into an increased protein flour (e.g., ~50 to 60 wt. % protein level) in a dry milling and air classification process, as an alternative to wet milling. In this process, dehulled peas are jet milled to a fine powder with particle sizes which allow separation with air classification, such that a protein enhanced fraction is separated from a starch fraction. This high protein flour may also be used as a raw material for the present process.

The yellow pea particles 103, which may be a flour, are then dispersed in water to form a slurry to which an alkaline protease and a base are added to carry out an alkaline proteolytic extraction. Optionally, if a yellow pea flour is not used as the raw material, the yellow pea particle size can be further reduced by wet milling the slurry using, for example, a colloid mill, a disintegrator, a grinder, or other device capable of reducing the particle size of the slurry. By way of illustration, the yellow pea particle size can be reduced, such that the particles have a mesh size in the range from about 60 to about 150 mesh, and desirably in the range from about 80 to about 150 mesh (about 100 to 200 microns). Typical pea particle concentrations in the slurry are in the range from about 5 wt. % to 15 wt. %, although concentrations outside of this range can be used. The slurry is heated at a temperature and for a period of time to allow the pea particles to undergo an alkaline extraction 104. For example, the slurry can be heated to a temperature in the range from about 100 to about 150 degrees F. for a period of about 10 to about 60 minutes.

Generally, enough base should be added to increase the pH of the slurry to a pH in the range from about 7.5 to about 9.5. Suitable bases include sodium hydroxide, potassium hydroxide, calcium hydroxide, or a combination thereof. In an alkaline proteolytic extraction, the protease cleaves the open structure of at least some of the yellow pea proteins and partially hydrolyses the yellow pea proteins and, therefore, the resulting proteins can be referred to as proteolytically modified yellow pea proteins. The concentration of the alkaline protease in the slurry and the duration of the hydrolysis are desirably limited, such that a Degree of Hydrolysis (DH) of no greater than 15 is achieved. This includes embodiments in which a DH of no greater than 14 is achieved, further includes embodiments in which a DH of no greater than 13 is achieved, still further includes embodiments in which a DH of no greater than 12 is achieved, and yet further includes embodiments in which a DH of no greater than 10 is achieved. For example, the DH can be in the range from 1 to 14. DH is calculated using the method entitled Degree of Hydrolysis via O-Phthaldialdehyde (the "WA Method") with test methodology published by Genencor International, Inc. (See, Nielsen P. M., Petersen D., and Dambmann C. 2001. Improved Method for Determining Food protein Degree of Hydrolysis. *Journal of Food Science*, Vol. 66, No. 5, pp. 642-646.) Generally, a protease concentration in the range from about 0.01 wt. % to about 0.1 wt. % and a reaction time in the range from about 1 hour to about 3 hours are sufficient.

A non-pH stat process may be used to allow the pH of the slurry to be reduced naturally as the hydrolysis reaction liberates a hydrogen molecule with each cut to the protein molecules. As the reaction progresses, the pH continues to drop and the activity of the enzyme is reduced with this pH drop, and, thus, the hydrolysis is self-limiting to a great extent. The alkaline protease enzymes are desirably of a molecular weight that enables the majority of the enzymes to be removed from the final product in the ultrafiltration step that is discussed in greater detail below.

The main classes of proteins in yellow field peas are albumins (~18-25% of the total protein), globulins (~55-80% of the total proteins), and convicilin (<5% of the total proteins) with minor quantities of prolamins and glutelins. (See, "Functional attributes of pea protein isolates prepared using different extraction methods and cultivars" Stone et al. Food Research International 76 (2015) pp. 31-18.) Globulins are further classified as legumin (11S fraction, 320-400 kDa molecular weight with 6 subunit pairs each containing one acidic 40 kDa and one basic subunit of 20 kDa), vicilin (7S fraction, 150,000 molecular weight with three subunits of 50 kDa each containing subunits for post-translational proteolytic cleavage resulting in fractions of 12-36 kDa), and convicilin (70 kDa). "Pea Proteins: A Review of Chemistry, Technology of Production, and Utilization", Owusu-Ansah et al. Food Reviews International, 7(1), pp. 103-134 (1991) identifies that pea albumin proteins contain several thousands of specific proteins with molecular weight profile ranging from 5 to 80 kDa with two predominant albumins in roughly equal quantities with 24 kDa and 25 kDa molecular weight fractions.

The alkaline protease cleaves the open tertiary structure of the protein molecules at specific points, breaking the protein molecules into smaller protein fragments having lower molecular weights. In particular, this mild proteolytic modification of the proteins reduces the molecular weight of the legumin, vicillin, and convicillin fractions of the yellow pea proteins into more soluble subunit fractions comprising molecular weights in the range of 20 to 70 kDa and reduces the albumins into more soluble subunits comprising molecular weights of 1 to 40 kDa.

The proteolytic modification of the proteins to smaller molecular weights and subunit size enables the capture all of globulin proteins without plugging the downstream ultrafiltration membranes. It also allows for the use of a smaller molecular weight cutoff membranes with an acceptable permeation rate that facilitates the capture and retention of albumin proteins in the final yellow pea protein concentrates. In addition, the smaller subunits of protein molecules are more soluble in the hot alkaline conditions, making them more bioavailable and improving their digestibility, and also have increased permeation rates through the ultrafiltration membrane, which is described in greater detail below.

Another benefit of the proteolytic modification of the yellow pea proteins is that the hydrolysis of the proteins by the alkaline protease reduces the emulsification of the native fat globules present at a low level in the raw material. Naturally occurring fat bodies exist (approximately 2.0 wt. % of the raw yellow peas) as reasonably large globules surrounded by emulsifying proteins with hydrophobic regions of the proteins sticking into the fat globules and the hydrophilic regions arranging themselves into the water phase. This emulsification of the fats by the yellow pea globulins can prevent, or significantly hinder, the removal of the fats during the separation of the water-insoluble components from the water-soluble components and the subsequent separation of the water-soluble, non-proteins from the water-soluble proteins. As a result, pea protein concentrates produced by conventional methods retain the fats that are present in the raw yellow pea material, which typically have fat contents in the range from about 10 wt. % to about 11 wt. %. In the present methods, the alkaline proteases hydrolyze serine and/or phenylalanine molecules causing the fats to become de-emulsified and broken up into smaller globules that are more easily oxidized to free fatty acids. These degraded and oxidized fats can then be removed by the downstream ultrafiltration process. As a result, embodiments of the methods are able to produce yellow pea protein concentrates having a fat content, as measured by acid hydrolyzed fat analyses, of 8 wt. % or lower, including fat contents in the range from 6 wt. % to 8 wt. %.

After achieving the aqueous alkaline extraction with proteolytic protein modification, water-insoluble materials (a "cake fraction") are separated from a protein-rich liquid extract that is enriched in solubilized proteins and other solubilized components, such as sugars. This can be accomplished, for example, using a physical separation technique and equipment, such as centrifugation, decanting, filtration, a hydro cyclone, a settling tank, a screening device, or a combination thereof. The selection of the devices and the number of separation steps and/or cycles is made such that an efficient separation of the protein-rich water-soluble fraction and water-insoluble fraction can occur. Generally, it is desirable to design the separation such that the quantity of water-insoluble material remaining in the water-soluble fraction is less than 3% solids by volume. At this low level, a yellow pea extract with acceptable protein concentration can be obtained without significantly plugging the ultrafiltration membranes used in the subsequent ultrafiltration. The water-insoluble solids thus separated are a by-product of the process and contain most of the water-insoluble proteins (prolamins and glutelins), fiber, starch, carbohydrates, and other non-protein materials. The removal of these compounds with low digestibility are required to achieve a pea protein concentrate with perfect or near-perfect digestibility. Furthermore, any residual insolubilized proteins, insolubilized carbohydrates, and fat in the protein-rich extract will tend to plug membranes.

The protein-rich, water-soluble fraction 105 contains a modest carbohydrate concentration (for example, about 30% carbohydrates) existing as starch, maltodextrins, smaller dextrins, maltose, glucose, sucrose and fibers. Optionally, the protein-rich, water-soluble fraction 105 can be processed by adding a bacterial amylase and a glucoamylase 106 at a pH, temperature, and time that is optimal for such enzymes to reduce the size of the carbohydrate fractions so that these carbohydrates will pass through into the permeate in the next step of the inventive process.

The resulting protein-rich, starch converted liquor 107 is further processed via ultrafiltration 108 to separate the water-soluble carbohydrates and other non-proteins and lower molecular weight water-soluble proteins from a retentate comprising relatively higher molecular weight water-soluble proteins 109. This step can be carried out in an ultrafiltration/diafiltration (UF/DF) apparatus using ultrafiltration membranes in a multi-stage system at an elevated temperature (i.e., at a temperature above ambient, room temperature); typically, a temperature in the range from about 100 degrees F. to about 150 degrees F. Using such an apparatus, the protein-rich, starch converted liquor from the previous step is fed into the first stage of the UF/DF system and is separated into a protein-rich retentate stream and a dilute permeate stream containing a small amount of proteins and most of the water-soluble non-protein components. The ultrafiltration membrane passes proteins and other components having molecular weights lower than the molecular weight cutoff of the membrane and retains proteins having molecular weights higher than the molecular weight cutoff of the membrane. In this way, the ultrafiltration concentrates the higher molecular weight yellow pea proteins in a retentate. In particular, by using an ultrafiltration membrane having a molecular weight cutoff of 5 kDa or lower, in conjunction with the upstream alkaline extraction, such as a proteolytic enzymatic extraction, the present processes have the ability to capture all, or substantially all, of the globulins and the majority of the albumin proteins, thereby improving the nutritional value of the yellow pea protein concentrates derived using the present methods.

In some embodiments of the methods, ultrafiltration membranes having a molecular weight cutoff of equal to or less than 5 kDa can be used. Such membranes include 5 kDa cutoff, 3 kDa cutoff, and 1 kDa cutoff membranes. For these lower molecular weight cutoff filters, larger molecular weight carbohydrates present in the soluble fraction after the insoluble separation step are, optionally, treated with amylase enzymes with the clarified extract to reduce their molecular weights, allowing for greater protein concentrations with improved permeation rates from reduced membrane plugging.

Multiple stages of the ultrafiltration can be carried out in order to provide a retentate with a high protein concentration. By way of illustration, a first stage of the ultrafiltration can be carried out until the UF feed concentration is at least doubled. The first stage retentate then can be diluted with a quantity of water equal to the amount of permeate removed in the first stage. This diluted retentate then can be fed into a second stage of the UF/DF system and the second stage can be carried out until the UF feed concentration is at least doubled. The second stage retentate then can be diluted with a quantity of water equal to the amount of permeate removed in the second stage. This diluted retentate then can be fed into a third stage of the UF/DF system and the third stage can be carried out until the UF feed concentration is at least doubled. This process can be repeated through a fourth stage, and further stages to achieve a desired yellow pea protein level of the final retentate. The resulting yellow pea protein concentration is desirably at least 70 wt. %, based on the dry weight basis, but can be higher. For example, some embodiments of the final ultrafiltration retentate have a yellow pea protein concentration of at least 72 wt. %, at least 75 wt. %, at least 80 wt. %, and at least 85 wt. %, based on the dry weight basis.

The number of stages utilized can be selected to optimize the speed of permeation with the area of the membranes to provide a desired throughput and product protein concentration. A batch or continuous UF/DF system can also provide a high final protein concentration, depending upon the amount of diafiltration water used. The amount of diafiltration water used typically will be between about 75 and about 200% of the weight of the original UF feed.

The final permeate and the final retentate obtained from the UF/DF system with 5 kDa membranes have very different compositions and properties, including different amino acid profiles. The final retentate has an amino acid profile in which the concentrations of 6 of the 11 essential amino acids are increased when compared to the raw material, and the final retentate also contains 14 wt. % more sulfur-containing amino acids per mg of protein than the raw material. The amino acid profile of the typical permeate contains a reduction in the concentrations of 10 of the 11 essential amino acids when compared to the raw material peas, and the sulfur-containing amino acid levels are reduced by 42 wt. % in the permeate compared to the raw material. Unexpectedly, the process preferentially recovers more of the essential amino acids present in the raw material, including the sulfur-containing amino acids and permeates fewer of the essential amino acids, including the sulfur-containing amino acids, as illustrated in Example 1.

Another benefit of the ultrafiltration process is the removal of low molecular weight enzymes, lipoxygenase, phytic acid, saponins, tannins, oligosaccharides, added alkaline protease, free fatty acids, fat degradation by-products, and/or other soluble compounds which are naturally present in the raw yellow peas. Some of these compounds are antinutritional factors which can contribute to poor digestibility of yellow pea proteins. Additionally, several of the aforementioned compounds contribute to poor organoleptic properties related to yellow peas and yellow pea proteins, as well as undesirable off-flavors. In various embodiments of the UF/DF process greater than 95 wt. % of the original water is removed, containing a similar amount of water-soluble non-protein solids of molecular weight less than 5 kDa.

The present methods are able to produce yellow pea protein concentrates with greater than 95% solubility. This is due to the removal of the insoluble proteins prior to the ultrafiltration and to the fact that the ultrafiltration process maintains the solubility of proteins that are extracted in the alkaline proteolytic extraction in a soluble form. By contrast isoelectric precipitation processes create insoluble proteins as a necessary step to allow for the separation from the non-protein soluble materials. The present methods create and maintain the solubility of the yellow pea proteins and remove many antinutritional factors, resulting in the production of yellow pea protein concentrates having a digestibility of 1.00.

The final retentate 109 of the multistage UF/DF system can be heat-treated to kill microorganisms and/or pathogens, and the solids level of the heat-treated protein-rich final retentate then can be increased in an evaporator 110 to the desired level to provide yellow pea protein concentrates 111 with different grades. The heat-treated, evaporated final retentate may be further processed by adding different types and quantities of processing aids and ingredients, heating and cooling steps, and other processes to differentiate the final retentate into dozens of end-use specific products differentiated by product physical properties, composition, and functionalities. These differentiated yellow pea protein concentrates can be spray dried into powders with typical moisture levels of for example, 4-6 wt. % moisture.

The protein concentrates have improved nutritional and functional properties which make them excellent ingredients for use in the protein fortification of foodstuffs and beverages. Foodstuffs and beverages refer to substances that are suitable for eating or drinking by humans and/or other animals. The protein concentrates described herein can be added to a wide range of foodstuffs and beverages, including those that would not otherwise have a complete amino acid profile, in order to provide a food product with improved nutritional properties. For example, the protein concentrates can be included in nutritional beverages, bars, and protein powders, replacing both animal proteins (meat, milk, whey, or egg derived) and other allergenistic plant-based proteins such as gluten and soy. The improvement to the nutritional performance is very important because % Daily Value of protein claims on the Nutritional Facts panel that is required on every food product sold are based on the PDCAAS of the protein source. Rice proteins is another important hypoallergenic plant-based protein, but the PDCAAS of rice protein is 0.45-0.60 with lysine as the deficient amino acid.

Various embodiments of the food products that include the protein concentrates, including those that include the protein concentrates as the sole protein source, provide a non-animal, plant-based, hypoallergenic food product with equal to or greater than 22 mg of sulfur-containing amino acids (Cysteine+Methionine) per gram of protein, a complete amino acid score for adults, an in vitro Protein Digestibility of at least 0.97, and a PDCAAS of at least 0.97. Included within these embodiments are food products that provide a non-animal, plant-based, hypoallergenic food product with equal to or greater than 23 mg of sulfur-containing amino acids (Cysteine+Methionine) per gram of protein, a complete amino acid score for older children (aged 3 years and up), adolescents, and adults, an in vitro Protein Digestibility of at least 0.98, and a PDCAAS of at least 0.98. Further included within these embodiments are food products that provide a non-animal, plant-based, hypoallergenic food product with equal to or greater than 27 mg of sulfur-containing amino acids (Cysteine+Methionine) per gram of protein, a complete amino acid score for children (aged 6 months to 3 years), an in vitro Protein Digestibility of 1.00, and a PDCAAS of 1.00.

The protein concentrates can be mixed with food-grade ingredients, including but not limited to, those that are Generally Recognized as Safe (GRAS) by the U.S. Food and Drug Administration to provide a solid (e.g. powder) or liquid supplement that can easily be mixed with or used as foodstuffs and beverages. For example, the concentrates can be mixed with coloring agents (e.g., natural dyes), flavoring agents (e.g., sugar and other natural sweeteners, natural vanilla flavoring, etc.), plant-based oils (e.g., canola oil, safflower oil, grapeseed oil, etc.), vitamins, minerals, preservatives, emulsifying agents, thickeners, and the like. The concentrates, alone or in combination with one or more of these additional ingredients, can then be included in a foodstuff or beverage by methods known in the field of food and beverage processing, such as simple mixing. The amount of the protein concentrate in a food product will depend on the beverage of foodstuff to which they are added. By way of illustration only, some food products will include about 1 to about 99 wt. % of the protein concentrate. This includes food products that contain about 2 to about 50 wt. % of the protein concentrate and further includes food products that contain about 5 to about 30 wt. % of the protein concentrate.

Certain embodiments of this invention have been utilized to successfully produce plant protein concentrates using other pulses such as dried beans, lentils, peas, and other legumes as raw materials. The plant-based protein concentrates from chickpeas, lentils, fava (faba) beans, mung beans and others produced utilizing the invention will have improved compositional and nutritional value when compared to their raw materials and protein products produced using conventional methods.

Specific examples of food products can include the protein concentrates made using the present methods include non-dairy based drinks, non-dairy yogurts, and non-dairy nutritional beverage powders.

EXAMPLES

Unless otherwise specifically indicated, concentrations recited as percentages in this disclosure, including these examples, refer to weight percentages.

Example 1

Processing of milled split yellow peas into a pea protein concentrate characterized by a complete amino acid profile for children (ages 6 months to 3 years), a sulfur-containing amino acid content of greater than or equal to 27 milligrams per gram of protein, an in vitro digestibility of 1.00, and PDCAAS of 1.00.

Yellow Field Peas harvested in Saskatchewan were cleaned, dehulled, and split in a commercial splitting operation (purchased from Belle Pulses, Donremy, SK, Canada), and then milled to a 120-mesh flour in a nutrimill stone mill with as-is analysis of protein 21.7%, ash 2.5%, and acid-hydrolyzed fat 1.8%. Sixty-five pounds of this flour was slurried at a solids level of 8.5% into water at 138 degrees F., pH adjusted to 9.2 with NaOH (50% concentration), and 29 grams of Alcalase 2.4 L protease was added. This protease reaction was maintained at 135 degree F. for one hour under agitation, and then was pumped to a Sharples P-660 horizontal decanter to separate water-soluble from water-insoluble material present in the protease reacted slurry. The insoluble fraction separated from the protease slurry had solids analysis of 20.37% and protein dry basis analysis of 7.6%. The solubles fraction (extract) separated in the decanter was 2.84% solids and dry basis protein analysis of 64.7%. The decanter was operated to achieve 0.7% solids-by-volume of the insoluble material remaining in the solubles fraction.

The solubles fraction (extract) from the decanter was further processed using a Westfalia SB-7 clarifying disk-type centrifuge separating the final insoluble material contained in the extract. The extract was separated in the clarifier into a sludge fraction containing the residual insoluble materials and a clarified extract fraction. The clarified extract fraction contained 3.00% solids and the insoluble spin down analysis was less than 0.1% solids by volume. The protein recovery in this alkaline proteolytic extraction, followed by a two-stage insoluble removal, was 77.9%.

The protein-rich, water-soluble clarified extract was heated to 155 degrees F. and the pH was adjusted to 6.0 with citric acid (20% concentration). 18 grams of Enzyme Development Corporation alpha amylase 2LC and 55 grams of Enzyme Development Corporation glucoamylase L1000 were added to the pH adjusted clarified extract and the reaction allowed to continue for 2 hours to convert larger molecular size starch, maltodextrin, and sugars to smaller molecular size to allow them to pass through the membrane in the ultrafiltration step.

The pH of the protein-rich, starch converted liquor was adjusted to 7.5 with NaOH (50% concentration), and then fed to a four-stage ultrafiltration membrane outfitted with a polyethersulfone membrane with 5,000 kDa molecular weight cutoff for separation of the larger protein molecules from the sugars, ash, and other non-protein components. The membrane was purchased from Microdyn Nadir and was an 8038 membrane with 31 mil spacers and containing 344 square feet of membrane surface. The amylase reacted clarified extract was processed and recirculated at 150 degrees F. until a 2× concentration of the retentate was achieved in the first stage of the ultrafiltration separation and then the processing was stopped (first stage diafiltration is finished). Diafiltration water (fresh, potable R/O water) was added to the first stage retentate in an amount equal to the permeate removed in the membrane from the first stage and the first stage retentate diluted with diafiltration water was processed in a second stage in the same manner as the first stage. The second stage retentate was diluted with diafiltration water in amount equal to the permeate removed in the second stage. This process was repeated until four stages have been completed. The retentate from stage 4 was not diluted and was further processed as described below. The amount of diafiltration water consumed was equal to the permeate removed in the four stages. The final protein-rich retentate contained 5.5% solids with a protein concentration of 79.9% dry basis protein. The average permeate solids was 0.26%, and the protein recovery in the ultrafiltration/diafiltration step was 83.2%.

The final protein-rich retentate was vat pasteurized at 190 degrees F. for 2 minutes, cooled to 170 degrees F. and fed to and recirculated in an evaporator until a minimum of 16% solids was achieved or two times the final ultrafiltration retentate solids level. The product was spray dried to 6.8% moisture in a NIRO atomizing wheel pilot spray drier with inlet temperature of 188 degrees C. and an exhaust temperature of 85 degrees C. The final yellow pea protein concentrate was analyzed to contain 79.9% dry basis protein. 70.0% percent of the protein contained in the raw material was collected in the pea protein concentrate produced. The flavor of the spray dried pea protein concentrate was very bland and contained none of the traditional 'pea' flavor off notes.

Figure 3:
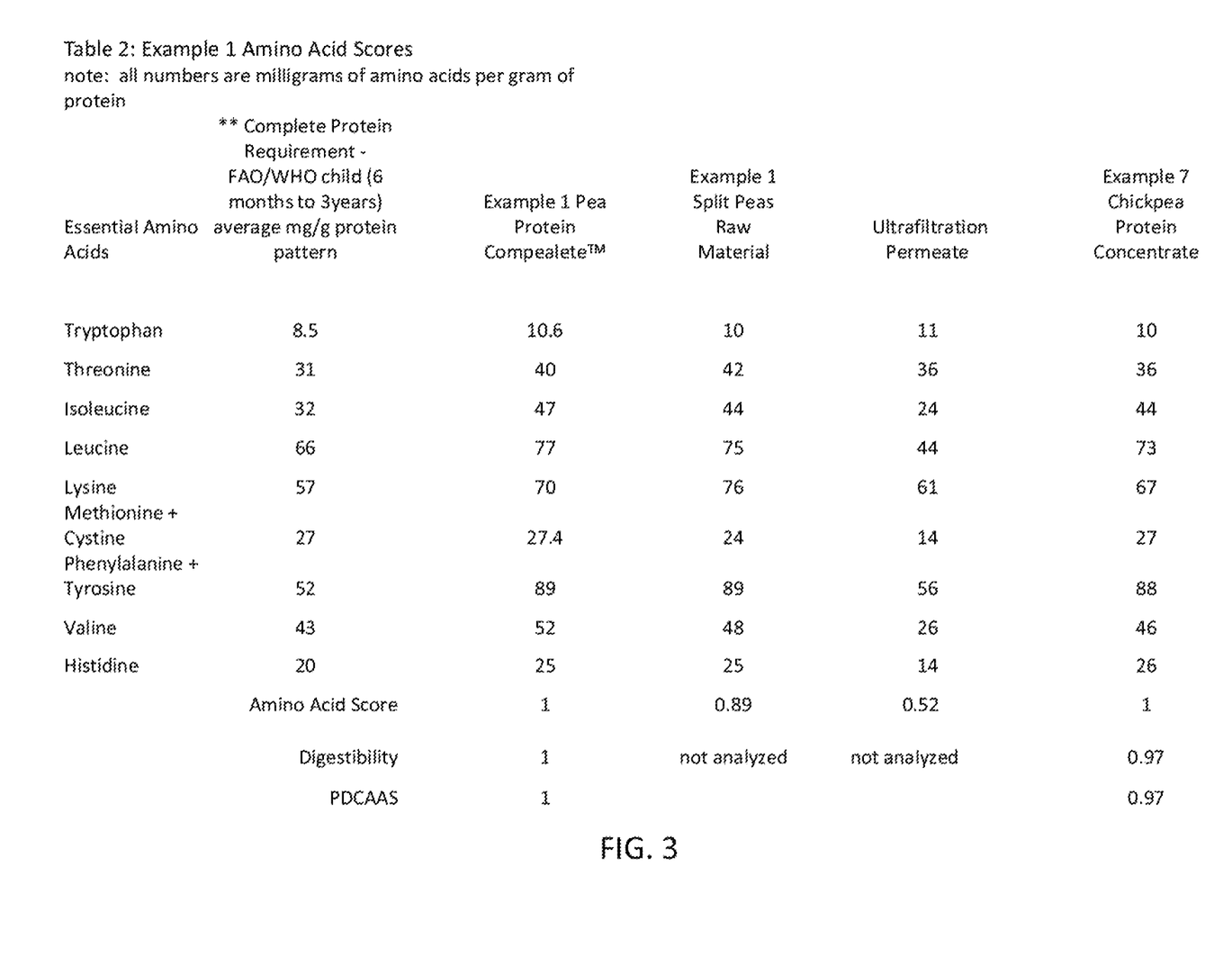
FIG. 3 shows the essential amino acid analysis and amino acid score of a split yellow pea raw material, a yellow pea protein concentrate as described in Example 1, and the combined ultrafiltration permeate produced from these split peas with a comparison to the amino acid reference pattern for children, aged 6 months to 3 years.

Table 2 in FIG. 3 contains the essential amino acid analysis and amino acid score of the yellow pea protein concentrate produced from the split peas in this Example 1 with a comparison to the amino acid reference pattern for a child aged 6 months through 3 years. The amino acid pattern of the yellow pea protein concentrate produced therefrom was not deficient in any essential amino acid and had an amino acid score of 1.00 and is a complete protein source for children aged 6 months through 3 years. It is noted that the amino acid score also is 1.00 for older children, adolescents, and adults. The sulfur containing amino acids content of the yellow pea protein concentrate was 27.4 mg/g protein.

The amino acid composition of the split pea raw material, the yellow pea protein concentrate, and a typical permeate is also summarized and compared in Table 2 in FIG. 3. The retentate is the concentrated liquid pea protein which becomes the final product of this process, and the permeate contains all the non-protein components and proteins of less than 5,000 kDa molecular weight which have been separated from the retentate in the ultrafiltration/diafiltration step. This is the last separation step in the inventive process. When the amino acid profile of the typical permeate is compared to the split pea raw material amino acid profile, ten of the eleven essential amino acids in the split pea raw material are reduced by 15% to 45%. At the same time, five of the eleven essential amino acids in the retentate contains an increase of 1% to 21% of the same amino acids compared to the split pea raw material. The ultrafiltration processing step preferentially concentrates ten of the eleven essential amino acids present in the raw material including the sulfur-containing amino acids. The sulfur-containing amino acids (cysteine+methionine) are increased in this processing step from 24 mg of these amino acids per gram of protein in the raw material up to 27.4 mg of these amino acids per gram of protein in the pea protein concentrate, a 14% increase.

The pea protein produced in this Example 1 has a sulfur-containing amino acid analysis of 27.4 milligrams of sulfur-containing amino acids per gram of protein compared to the FAO/WHO reference pattern of 27 mg/g for children aged 6 months through 3 years, and the FAO/WHO reference pattern of older children, adolescents, and adults of 23 milligrams per gram.

The digestibility of the pea protein concentrate produced in this Example 1 was analyzed by General Mills laboratory (Medallion Labs) using the in vitro analysis technique (U.S. Pat. No. 9,378,920) and determined to have a digestibility score of 1.00. The protein contains 27.4 mg of sulfur-containing amino acids per gram of protein, the amino acid score of 1.00, and a digestibility of 1.00, and the pea protein concentrate produced in Example 1 is a complete protein for older children, adolescents, and adults with a PDCAAS of 1.00.

Comparative Example 2

This example compares the essential amino acid profile, Digestibility Score, and PDCAAS for a yellow pea protein concentrate made via an isoelectric precipitation, which is similar in concept and results to a fermentation process, to the yellow pea protein concentrate produced in Example 1.

Using the same starting raw material as Example 1: Yellow Field Peas harvested in Saskatchewan were cleaned, dehulled, and split in a commercial splitting operation (purchased from Belle Pulses, Donremy, SK, Canada), and then milled to a 120-mesh flour in a nutrimill stone mill with as is analysis of protein 20.7%, ash 2.5%, and acid-hydrolyzed fat 2.5%. Sixty pounds of this flour (which is the same flour used in Example 1) was slurried at a solids level of 10.1% into water at 140 degrees F. with pH adjusted to 9.2 with NaOH (50% concentration). No protease reaction was performed and the extraction continued for one hour. The extraction slurry was pumped to a Sharples P-660 horizontal decanter to separate soluble from insoluble material present in the protease reacted slurry. The insoluble fraction separated from the protease slurry had solids analysis of 30.27% and protein dry basis analysis of 4.7%. The solubles fraction (extract) separated in the decanter was 3.0% solids and dry basis protein analysis of 52.1%. The decanter was operated to achieve 8.3% solids-by-volume of the insoluble material remaining in the solubles fraction.

The solubles fraction (extract) from the decanter was further processed using a Westfalia SB-7 clarifying disk-type centrifuge separating the final insoluble material contained in the extract. The extract was separated in the clarifier into a sludge fraction containing the residual insoluble materials and a clarified extract fraction. The clarified extract fraction contained 2.94% solids with 52.7% dry basis protein analysis and the spin down analysis was 2.5% solids by volume. The protein recovery in this alkaline extraction, followed by a two-stage insoluble removal, was 88.5%.

The pH of the clarified extract was adjusted to the pH of 4.3 with hydrochloric acid (10% concentration) and the precipitated clarified extract was fed to a Sharples P-660 decanter to separate precipitated protein (curds) from the acid whey. The precipitated clarified curd had a solids level of 6.61% and a protein dry basis of 48.1%, and the whey had a solids level of 2.56% and a protein dry basis of 18.4%. The protein recovery in this separation was 84.2%, and the overall protein recovery was 74.5% of the protein contained in the raw material. A single stage separation was performed with a 2 times concentration of the precipitate and 65% of the original water was removed resulting in a lower final product protein concentration. A second stage washing of the separated precipitated protein was not performed, and this second stage would have increased the protein concentration but would increase the amount of proteins (mostly albumin proteins) lost in the whey further removing the sulfur amino acid amino acid concentration in the final pea protein product.

The final retentate was vat pasteurized at 190 degrees F. for 2 minutes, cooled to 175 degrees F. and fed into and recirculated in an evaporator until 15.6% solids was achieved. The product was spray dried to 4.3% moisture in a NIRO atomizing wheel pilot spray drier with an inlet temperature of 185 degrees C. and an exhaust temperature of 88 degrees C. The final product was analyzed to contain 69.2% dry basis protein.

Figure 4:
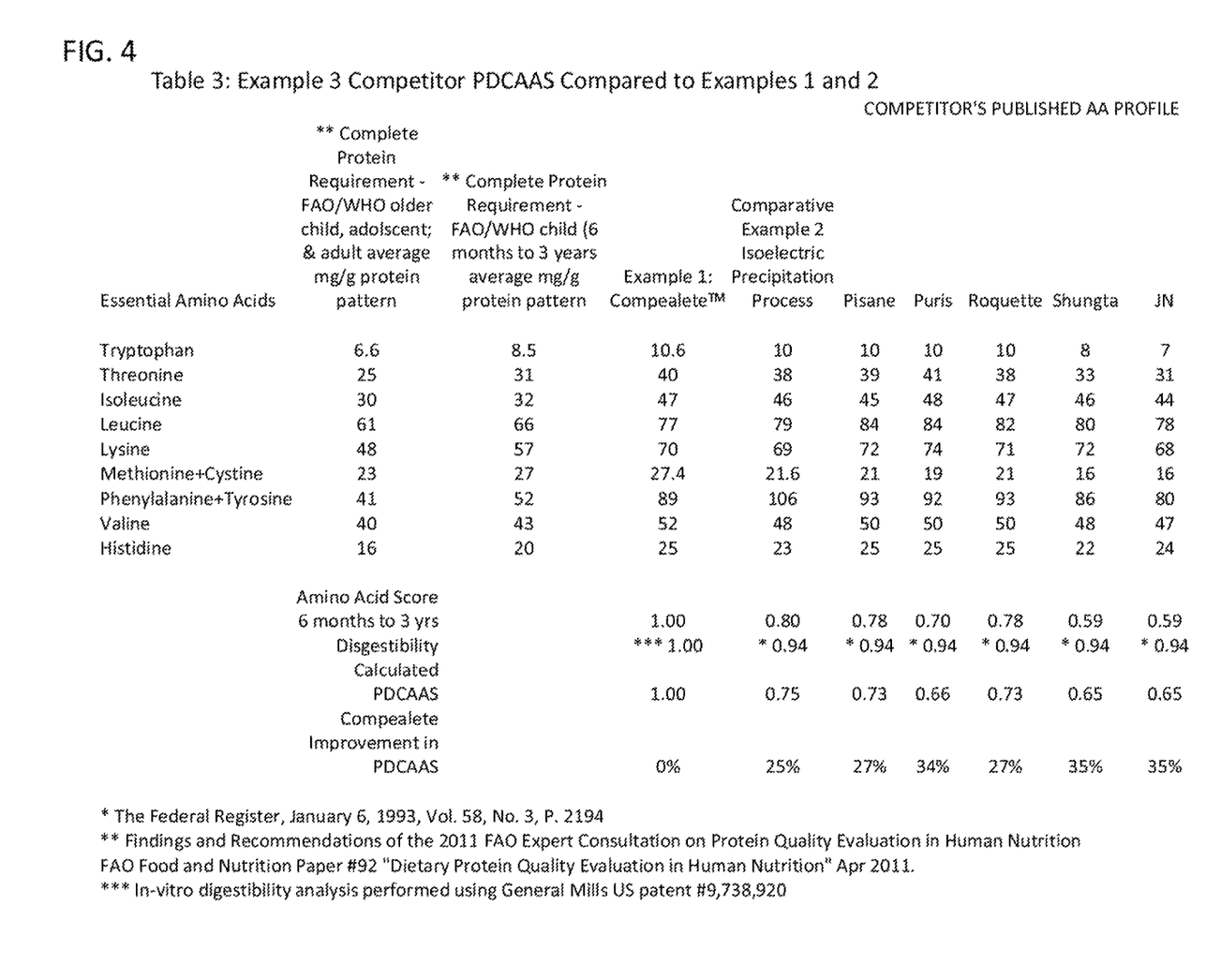
FIG. 4 shows a comparison of the pea protein concentrates produced in Example 1, Example 2 (comparative), and five commercially available yellow pea protein concentrates produced by other pea protein manufacturers with the complete essential amino acid requirement for children aged 6 months to 3 years, and to the complete essential amino acid requirement for older children, adolescents, and adults (aged 3 years and up).

Table 3 in FIG. 4 contains the essential amino acid analysis and amino acid score of the pea protein concentrate produced in this Example 2 and compares it to the amino acid reference pattern for children aged 6 months to 3 years, the amino reference pattern for older children, adolescents, and adults, and the essential amino acid profile of the pea protein produced in Example 1. It is noted that the raw material for Example 1 and Example 2 is the same lot of milled split yellow peas. The amino acid pattern of the pea protein concentrate produced in Example 2 was deficient in the sulfur-containing amino acids with 21.6 mg/g protein and has an amino score of 0.80. The pea protein product produced in Example 2 had a digestibility of 0.94 and the PDCAAS is 0.75. The pea protein produced in this Example 2 was deficient in sulfur-containing amino acids and is a not a complete protein source for children aged 6 months through 3 years and is not a complete protein source for older children, adolescents, and adults (ages 3 years and up).

Table 3 in FIG. 4 shows a comparison of pea protein concentrates produced in Examples 1 and 2 and five yellow pea protein concentrates produced by other pea protein concentrate manufacturers. The yellow pea protein concentrate produced in Example 1 had an amino acid score of 1.00, while the yellow pea protein concentrate of Example 2 had an amino acid score of only 0.80. It is noted that the PDCAAS of the concentrate of Example 2 is directly comparable to scores calculated for the Pisanne and Puris yellow pea protein concentrates, which are produced using the ion exchange or isoelectric precipitation method and are 25-35% below the PDCAAS levels of Example 1.

The yellow pea protein concentrate of Example 2, which was produced in the alkaline extraction, insolubles separation, and isoelectric precipitation process compares poorly to the alkaline proteolytic extraction, insoluble separation, and ultrafiltration/diafiltration process of this invention, as further illustrated in Example 1. Clearly, the product and process of Example 2 (which is the most widely used process in commercial production) creates a yellow pea protein concentration that is deficient in sulfur-containing amino acids with reduced digestibility from the same raw material.

The amino acid score of the pea protein concentrate of Example 2 may be improved to a complete amino acid profile by the addition of an additional processing step. The acid whey generated in the separation of the precipitated proteins may be further processed using an amylase and glucoamylase carbohydrate reaction followed by a UF/DF system to capture proteins which are present in this acid whey, and these proteins scrubbed from the acid whey may be added back to the pea protein produced in Example 2 before spray drying. The acid whey contains the majority of the albumin proteins present in the raw peas, and combining these albumin proteins with the precipitated proteins will result in a product with an amino acid score of 1.00. This is an alternate embodiment of the process.

Comparative Example 3

This example compares the essential amino acid profile, Digestibility Score, and PDCAAS for commercially available yellow pea protein concentrates with the pea protein concentrates produced in Examples 1 and 2.

Material Specification and Marketing Communication Information Sheets have been obtained from the five largest commercial yellow pea protein manufacturers worldwide. The commercial yellow pea protein manufacturers are listed below, including the location of their respective countries of manufacture and the type of processing methods utilized in the manufacture of their respective yellow pea protein concentrates:

| Company | Location | Process |
| --- | --- | --- |
| Pisanne (Cosucre) | Netherlands | isoelectric precipitation |
| Puris (World Foods) | US | isoelectric precipitation |
| Roquette | France | salt/ion exchange |
| Shungta | China | fermentation/precipitation |
| Jinguan | China | isoelectric precipitation |

Table 3 in FIG. 4 is a summary of the amino acid analysis data taken directly from their publicly distributed specification sheets of the five competitive pea protein manufacturing companies listed above compared to the essential amino acid analysis of pea protein concentrates produced in Examples 1 and 2. Comparing the amino acid analysis expressed in milligrams per gram of protein, all five commercial producers of yellow pea protein concentrates list a sulfur-containing amino acid analysis of 16-21 milligrams per gram of protein and the two samples prepared in Examples 1 and 2 contain 27.4 and 21.6 milligrams per gram of protein. The suggested reference pattern for older child, adolescents, and adults is 23 milligrams per gram of sulfur-containing amino acids. The suggested reference pattern for children aged 6 months through 3 years is 27 mg/g of protein. The pea protein concentrate produced in Example 1 exceeds the reference pattern, while all of the commercially available pea protein products are deficient in sulfur-containing amino acids.

The amino acid score is calculated for the yellow pea protein concentrates obtained in Example 1. Example 2, and the five largest yellow pea protein concentrate manufacturers and are shown on Table 3 of FIG. 4. The yellow pea protein concentrate prepared in Example 1 has a calculated amino acid score of 1.00 and the five commercially available yellow pea protein concentrates have calculated amino acid scores of 0.59 to 0.78. The digestibility for the yellow pea protein concentrate of Example 1 is 1.00, while the commercially available yellow pea protein concentrates cite a digestibility of 0.94, as identified in the Federal Register. The PDCAAS of the yellow pea protein concentrate produced in Example 1 was 1.00, while the five commercially available yellow pea protein concentrates have PDCAAS of only 0.65 to 0.73. The PDCAAS of the yellow pea protein concentrate of Example 1 was a 27% to 35% improvement over the five commercially available yellow pea protein concentrates, and a 25% improvement when compared to the yellow pea protein concentrate of Example 2.

Example 4

Preparation of a hypoallergenic, plant based, non-dairy, aseptically filled ready-to-drink beverage (RTD). This RTD beverage has a protein and macro and micro nutrient content level equal to skim milk from cows with a sulfur-containing amino acid level of 27 mg per gram of protein, amino acid score of 1.00, a Digestibility Score of 1.00, and a PDCAAS of 1.00 for children, aged 6 months to 3 years and, as such, also provides a PDCAAS of 1.00 for older children, adolescents, and adults (aged 3 years and up).

Formula

| Ingredient | % |
| --- | --- |
| Pea Protein Concentrate (produced in Example 1) | 4.1200% |
| Sucrose | 2.5500% |
| Canola/Safflower Oil | 0.8000% |
| Tricalcium phosphate | 0.4770% |
| Locust Bean Gum (TIC Gums) | 0.0320% |
| Gellan Gum Kelcogel HS-B (CP Keleo) | 0.1200% |
| Sea Salt | 0.1000% |
| Liquid Sunflower Lecithin (Austrade) | 0.1400% |
| Vanilla Flavor #113940 (Natural Flavors Inc.) | 0.0194% |
| Cream Flavor #115666 (Natural Flavors Inc.) | 0.0500% |
| Vitamins Package WE-24994 (Wright Group) | 0.0230% |
| Water | 91.5686% |
| Total | 100.000000% |

Batch Mixing Instructions:

Fill high-shear mixer and batch tank with 70% of batch water called in formula at less than 60 degrees F. Start recycle pumping loop between high-shear mixer and batch holding tank. Add yellow pea protein concentrate slowly to the water to ensure hydration with low dusting. Add remaining ingredients in the order shown above to high-shear mixer. Premix Gellan Gum and Locust Bean Gum with Tricalcium Phosphate before adding. Continue to mix for 15 minutes and recycle product from batch tank through high-shear mixer. Adjust solids as needed with water withheld from batch (approximately 21.56% of formula). Product mixture should be continually agitated to prevent settling of Tricalcium Phosphate.

Processing Instructions:

Process Product Aseptically using steam injection according to FDA aseptic process filing (293° F. for 9 seconds). Cool to less than 180° F. and homogenize at 3500 psi combined $1^{st}/2^{nd}$ stage before thermal processing/sterilization. Continuously agitate product in sterile holding tank to prevent settling. Package aseptically in sterilized cartons with Nitrogen headspace gas.

Finished Product Solids Target 8.13% 0.10%

100% of the ingredients in the RTD formula in Example 4 are plant-based and no animal-based ingredients are used in the preparation, 100% of the RTD protein source is a pea protein concentrate produced according to Example 1, which has a calculated PDCAAS of 1.00. Accordingly, the RTD produced in Example 4 is a hypoallergenic, cholesterol-free beverage with 27 mg of sulfur-containing amino acids per gram of protein, an amino acid score of 1.00, a Digestibility Score of 1.00, and a PDCAAS of 1.00 for children, aged 6 months to 3 years and for older children, adolescents, and adults (aged 3 years and up).

Example 5

Preparation of a hypoallergenic, plant based, non-dairy, aseptically filled, Greek-style yogurt. This cholesterol-free yogurt has a protein level similar to Greek-style low fat yogurt produced from cow's milk in macro and micro nutrient content. The yogurt has a sulfur-containing amino acid content of 27 mg per gram of protein, an amino acid score of 1.00, a Digestibility Score of 1.00, and a PDCAAS of 1.00 for children, aged 6 months to 3 years and for older children, adolescents, and adults (aged 3 years and up).

Formula

| Ingredients | % |
|---|---|
| Pea Protein Concentrate (produced in Example 1) | 10.00% |
| Sugar | 6.50% |
| Calcium Chloride | 0.25% |
| Wright vitamin mineral blend | 0.4 |
| Active yogurt cultures | 0.05 |
| Water | 82.80 |
| Total | 100.00% |
| Fruit Preparation, 20 brix | 12.50% |

Batch Mixing and Packaging Instructions

Dry blend pea protein, sugar, and vitamin mineral blend. Heat water to 100 degrees F. and mix dry blended powders into water in a well agitated liquid blender. When fully dispersed, heat to 140 degrees and homogenize in a two-stage homogenizer with 2000 psi first stage and 500 psi second stage. Heat the homogenized mixture to 165 degrees and hold for one minute, then cool to 140 degree F. Under good agitation, slowly add cultures and dilute calcium chloride. Just prior to packaging, combine fruit preparation with homogenized yogurt by mixing 87.5% of the yogurt mix with 12.50% of the fruit preparation and package aseptically in plastic cups.

100% of the ingredients in the yogurt produced in Example 5 are plant-based and no animal-based ingredients are used in the preparation. 100% of the protein source in the Greek-style yogurt is a yellow pea protein product concentrate according to Example 1. Accordingly, the Greek-style yogurt produced in Example 4 is a cholesterol free, hypoallergenic, Greek-style yogurt with a sulfur-containing amino acid level of 27 mg per gram of protein, an amino acid score of 1.00, a Digestibility Score of 1.00, and a PDCAAS of 1.00 for children, aged 6 months to 3 years, and for older children, adolescents, and adults (aged 3 years and up).

Example 6

Preparation of a hypoallergenic, plant based, non-dairy, lactose-free nutritional beverage powder for toddlers aged 3-5 years. This cholesterol-free toddler beverage has a protein level similar to toddler formula produced from cow's milk in macro and micro nutrient content. The beverage powder has a sulfur-containing amino acid level of 27 mg per gram of protein, an amino acid score of 1.00, a Digestibility Score of 1.00, and a PDCAAS of 1.00 for children, aged 6 months to 3 years and for older children, adolescents, and adults (aged 3 years and up).

| Dry Solids Ingredients | % Dry | % of liquid mix |
|---|---|---|
| Tapioca Syrup Solids | 39.3% | 15.72% |
| High Oleic Sunflower Oil | 28.5% | 11.40% |
| Pea Protein Concentrate (produced in Example 1) | 20.4% | 8.16% |
| Sugar | 8.5% | 3.40% |
| Wright Vitamin Mineral & Oil Blend | 3.8% | 1.52% |
| Sunflower Lecithin | 0.7% | 0.28% |
| Salt | 0.2% | 0.08% |
| Natural Vanilla Flavor | 0.075% | 0.003% |
| Water | — | 60.0% |
| Totals | 100.00% | 100.00% |

Mixing and Processing Instructions

Water at 125 degrees F. is put into a liquid blender and the yellow pea protein concentrate is added under agitation and mixed for 20 minutes to allow the proteins to solubilize. After protein solubilization, the carbohydrates (tapioca solids and sugar) are added to the liquid protein mix and held under agitation for 10 minutes after the last addition to allow mixing. The Sunflower Oil and Lecithin are added and the mixture is heated to 145 degrees F. The Vitamin Mineral Mix, salt, and flavors are added and the product is immediately homogenized in a two-stage homogenizer at 2000 psi first stage and 500 psi second stage. The homogenized mixture is heated to 200 degrees F., held for 30 seconds, cooled to less than 150 degrees F., and is spray dried to a fine powder with less than 4.0% moisture in a tall form spray drier. The toddler powder is packaged in 1-2-pound cans or plastic bottles. 40 grams of toddler beverage powder is stirred into 250 ml of room temperature water before consumption by an older child 3 years old and up.

Preparation of a hypoallergenic, plant based, non-dairy, lactose-free nutritional beverage for toddlers aged 3-5 years is accomplished. This cholesterol-free toddler beverage has a protein level similar to toddler formula produced from cow's milk in macro and micro nutrient content. The beverage has an amino acid score of 1.00, a Digestibility Score of 1.00, and a PDCAAS of 1.00.

100% of the ingredients in the toddler beverage powder produced in Example 6 are plant-based and no animal-based ingredients are used in the preparation. 100% of the protein source in the toddler beverage powder is a yellow pea protein concentrate produced according to Example 1. Accordingly, the toddler beverage powder produced in Example 6 is a cholesterol free, lactose-free, hypoallergenic, toddler beverage powder with a sulfur-containing amino acid score of 27 mg per gram of protein, an amino acid score of 1.00, a digestibility of 1.00, and a PDCAAS of 1.00 for children, aged 6 months to 3 years, and for older children, adolescents, and adults (aged 3 years and up). 250 ml of the reconstituted toddler beverage powder contains 25% of the RDA of protein, vitamins, and minerals for an older child of 3-5 years old.

Example 7

This example illustrates the processing of a chickpea flour into a chickpea protein concentrate characterized by a complete amino acid profile for children (ages 6 months to 3 years) and older children (aged 3 years and up), adolescents, and adults, a sulfur-containing amino acid content of greater than or equal to 27 milligrams per gram of protein, an in vitro digestibility of 0.97 and PDCAAS of 0.97.

Chickpea flour was purchased from Nuts.com with as-is analysis of protein 23.0%, ash 3.9%, acid-hydrolyzed fat 6.8%, and a moisture level of 7.3%. Fifty pounds of this flour was slurried at a solids level of 9.6% into water at 118 degrees F. and pH was adjusted to 8.5 with NaOH (50% concentration). This slurry was maintained at 115 to 118 degrees F. for forty-five minutes under agitation, and then was pumped to a Sharples P-660 horizontal decanter to separate soluble from insoluble material present in the slurry. The insoluble fraction separated from the slurry had solids analysis of 25.9% and protein dry basis analysis of 8.2%. The solubles fraction (extract) separated in the decanter was 5.84% solids and dry basis protein analysis of 52.6%. The decanter was operated to achieve 2.0% solids-by-volume of the insoluble material remaining in the solubles fraction.

The solubles fraction (extract) from the decanter was further processed using a Westfalia SB-7 clarifying disk-type centrifuge separating the final insoluble material contained in the extract. The extract was separated in the clarifier into a sludge fraction containing the residual insoluble materials and a clarified extract fraction. The clarified extract fraction contained 5.5% solids and the spin down analysis was less than 0.1% solids by volume. The protein recovery in this alkaline extraction, followed by a two-stage insoluble removal, was 79.7%.

The clarified extract was heated to 140 degrees F. and the pH was adjusted to 7.5 with hydrochloric acid (10% concentration), and then fed to a four-stage ultrafiltration membrane outfitted with a polyethersulfone membrane with 5,000 kDa molecular weight cutoff for separation of the larger protein molecules from the sugars, ash, and other non-protein components. The membrane was purchased from Microdyn Nadir and was an 8038 membrane with 31 mil spacers and containing 344 square feet of membrane surface. The clarified extract was processed and recirculated at 150 degrees F. until a 2x concentration of the retentate was achieved in the first stage of the ultrafiltration separation and then the processing was stopped (first stage diafiltration is finished). Diafiltration water (fresh, potable R/O water) was added to the first stage retentate in an amount equal to the permeate removed in the membrane from the first stage and the first stage retentate diluted with diafiltration water is processed in a second stage in the same manner as the first stage. The second stage retentate is diluted with diafiltration water in amount equal to the permeate removed in the second stage. This process is repeated until four stages have been completed. The retentate from stage 4 is not diluted and is further processed as described below. The amount of diafiltration water consumed is equal to the permeate removed in the four stages. The final retentate contains 4.8% solids with a protein concentration of 82.7% dry basis protein. The average permeate solids was 0.59%, and the protein recovery in the ultrafiltration/diafiltration step was 92.6%.

The final retentate is vat pasteurized at 170 degrees F. for 10 minutes and fed to and recirculated in an evaporator until a minimum of two times the final ultrafiltration retentate solids level. The product is spray dried to 6.0% moisture content in a NIRO atomizing wheel pilot spray drier with inlet temperature of 185 degrees C. and an exhaust temperature of 95 degrees C. The final product is analyzed to contain 77.3% dry basis protein. 73.8% percent of the protein contained in the raw material is collected in the pea protein concentrate produced. The flavor of the spray-dried chickpea protein concentrate is very bland and contains no flavor off notes.

The chickpea protein concentrate produced from the split peas in this example was compared to the amino acid reference profile for child aged 6 months through 3 years. The amino acid profile of the chickpea protein concentrate is not deficient in any essential amino acid and has an amino acid score of 1.00 and provides a complete amino acid profile for children aged 6 months through 3 years. The amino acid score also is 1.00 for older children, adolescents, and adults. The sulfur-containing amino acids of the chickpea protein is 27.4 mg/g protein compared to the FAO/WHO reference pattern of 27 mg/g for children aged 6 months through 3 years, and the FAO/WHO reference pattern of older children, adolescents, and adults of 23 milligrams per gram.

The digestibility of the pea protein concentrate produced in this example was analyzed by General Mills laboratory (Medallion Labs) using the in vitro analysis technique (U.S. Pat. No. 9,378,920) and determined to be 0.97.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A yellow pea protein composition comprising hydrolyzed albumin and globulin proteins, wherein the yellow pea protein composition has a yellow pea protein concentration of at least 70%, based on dry weight, is free of proteins other than yellow pea proteins, and has a Protein Digestibility Corrected Amino Acid Score value of at least 0.98 for older children, adolescents, and adults (ages 3 and up), and further wherein the hydrolyzed albumin and globulin proteins have an average molecular weight that is lower than the average molecular weight of albumin and globulin proteins in natural yellow peas.

2. The yellow pea protein composition of claim 1 comprising greater than or equal to 23 milligrams of sulfur-containing amino acids per gram of protein.

3. The yellow pea protein composition of claim 1 having an in vitro Protein Digestibility of at least 0.98.

4. The yellow pea protein composition of claim 1 having a Protein Digestibility Corrected Amino Acid Score value of at least 0.98 for children ages 6 months to 3 years and greater than or equal to 27 milligrams of sulfur-containing amino acids per gram of protein.

5. The yellow pea protein composition of claim 1 having a yellow pea protein concentration of at least 80%, based on dry weight.

6. The yellow pea protein composition of claim 1 having a DH value of greater than 0, but less than 15.

7. The yellow pea protein composition of claim 1 having a Protein Digestibility Corrected Amino Acid Score value of at least 0.99 for older children, adolescents, and adults (ages 3 and up).

8. The yellow pea protein composition of claim 1 having a Protein Digestibility Corrected Amino Acid Score value of 1.00 for older children, adolescents, and adults (ages 3 and up).

9. The yellow pea protein composition of claim 1 having a Protein Digestibility Corrected Amino Acid Score value of 1.00 for children ages 6 months to 3 years.

10. A food product comprising:
   a beverage or foodstuff, other than yellow peas; and
   a yellow pea protein composition combined with the beverage or foodstuff,
   wherein the yellow pea protein composition comprises hydrolyzed albumin and globulin proteins, has a yellow pea protein concentration of at least 70%, based on dry weight, is free of proteins other than yellow pea proteins, and has a Protein Digestibility Corrected Amino Acid Score value of at least 0.98 for older children, adolescents, and adults (ages 3 and up), and further wherein the hydrolyzed albumin and globulin proteins have an average molecular weight that is lower than the average molecular weight of albumin and globulin proteins in natural yellow peas.

11. The food product of claim 10, wherein the yellow pea protein composition has an in vitro Protein Digestibility of at least 0.98.

12. The food product of claim 10, wherein the yellow pea protein composition has a Protein Digestibility Corrected Amino Acid Score value of at least 0.98 for children ages 6 months to 3 years and greater than or equal to 27 milligrams of sulfur-containing amino acids per gram of protein.

13. The food product of claim 10, wherein the food product is free of plant proteins other than yellow pea proteins.

14. The food product of claim 10, wherein the yellow pea protein composition has a yellow pea protein concentration of at least 80%, based on dry weight.

15. The food product of claim 10, wherein the food product is a non-dairy liquid beverage, a non-dairy beverage powder, and/or a food product comprising active yogurt cultures.

16. The food product of claim 10, wherein the yellow pea protein composition has a DH value of greater than 0, but less than 15.

17. The food product of claim 10, wherein the yellow pea protein composition has an in vitro Protein Digestibility of at least 0.99 and a Protein Digestibility Corrected Amino Acid Score value of at least 0.99 for older children, adolescents, and adults (ages 3 and up).

18. The food product of claim 10, wherein the yellow pea protein composition has an in vitro Protein Digestibility of 1.00 and a Protein Digestibility Corrected Amino Acid Score value of 1.00 for older children, adolescents, and adults (ages 3 and up).

19. The food product of claim 10, wherein the yellow pea protein composition has an in vitro Protein Digestibility of 1.00 and a Protein Digestibility Corrected Amino Acid Score value of 1.00 for children ages 6 months to 3 years.

* * * * *